United States Patent
Hassan

(10) Patent No.: US 9,799,374 B2
(45) Date of Patent: Oct. 24, 2017

(54) METHOD AND SYSTEM FOR TRACKING AND ANALYZING BROWSER SESSION DATA WITHIN ONLINE VIDEO VIA THE VIXEL DELIVERY MECHANISM

(71) Applicant: White Ops, Inc., Brooklyn, NY (US)

(72) Inventor: Tamer Hassan, New York, NY (US)

(73) Assignee: WHITE OPS, INC., New York, NY (US)

( * ) Notice: Subject to any disclaimer, the term of this patent is extended or adjusted under 35 U.S.C. 154(b) by 2 days.

(21) Appl. No.: 14/734,975

(22) Filed: Jun. 9, 2015

(65) Prior Publication Data
US 2015/0356999 A1 Dec. 10, 2015

Related U.S. Application Data

(60) Provisional application No. 62/009,533, filed on Jun. 9, 2014.

(51) Int. Cl.
*G11B 27/22* (2006.01)
*G06F 17/30* (2006.01)
*H04N 21/44* (2011.01)
*H04N 21/442* (2011.01)
*H04N 21/81* (2011.01)
*H04N 21/858* (2011.01)

(52) U.S. Cl.
CPC ........ *G11B 27/22* (2013.01); *G06F 17/30799* (2013.01); *H04N 21/44008* (2013.01); *H04N 21/44222* (2013.01); *H04N 21/812* (2013.01); *H04N 21/858* (2013.01)

(58) Field of Classification Search
CPC ........ G11B 27/105; G11B 27/22; H04N 5/04; H04N 21/44008; H04N 21/44222; H04N 21/812; H04N 21/858; G06F 17/30799
USPC ................................ 386/239, 241, 248–250
See application file for complete search history.

(56) References Cited

U.S. PATENT DOCUMENTS

| | | | | |
|---|---|---|---|---|
| 6,064,399 A * | 5/2000 | Teo | .......................... | G06T 15/04 345/629 |
| 8,429,243 B1 * | 4/2013 | Wang | .................. | G06Q 30/0246 709/217 |
| 8,789,083 B1 * | 7/2014 | Landers | ........... | H04N 21/25891 725/10 |
| 2006/0107056 A1 * | 5/2006 | Bhatt | .................... | G06T 1/0021 713/176 |

(Continued)

*Primary Examiner* — Mishawn Hunter
(74) *Attorney, Agent, or Firm* — Nadya Reingand; Yan Hankin

(57) ABSTRACT

Disclosed herein are methods and systems for new analytic pathways for collecting information regarding video playback by human (and automated) users. This is achieved in part by placing certain elements (Vixels) within the code of a video file prior to it being uploaded by a user who shares the video. Whenever and wherever the video is played, whether it is streamed once, downloaded and played several times thereafter, or played for a mass audience, the analytic pathway is triggered each and every time the video file is played because the elements triggering the collection of analytics exist in the video file itself. By embedding Vixels into video files at or before upload, the analytics mechanisms are triggered by the embedded Vixel regardless of how, where, when, and by whom the video is played back, forming the framework for a simpler and more accurate analytics network.

11 Claims, 2 Drawing Sheets

(56) References Cited

U.S. PATENT DOCUMENTS

| | | | |
|---|---|---|---|
| 2009/0037947 A1* | 2/2009 | Patil | H04N 21/812 |
| | | | 725/32 |
| 2010/0287580 A1* | 11/2010 | Harding | G06Q 30/0247 |
| | | | 725/14 |
| 2013/0276021 A1* | 10/2013 | Cho | H04N 21/80 |
| | | | 725/32 |
| 2014/0143670 A1* | 5/2014 | Swaminathan | G06F 3/0481 |
| | | | 715/720 |
| 2014/0208379 A1* | 7/2014 | Sinha | H04N 7/025 |
| | | | 725/116 |
| 2015/0023652 A1* | 1/2015 | Harjanto | H04N 21/23424 |
| | | | 386/249 |
| 2015/0043892 A1* | 2/2015 | Groman | G11B 27/034 |
| | | | 386/278 |

* cited by examiner

METHOD AND SYSTEM FOR TRACKING AND ANALYZING BROWSER SESSION DATA WITHIN ONLINE VIDEO VIA THE VIXEL DELIVERY MECHANISM

CROSS-REFERENCE TO RELATED APPLICATIONS

This patent application claims priority to, and incorporates fully by reference, Provisional U.S. Patent Application Ser. No. 62/009,533, filed Jun. 9, 2014; it is also a Continuation-in-Part of U.S. patent application Ser. No. 14/093,964, filed Dec. 2, 2013.

FIELD OF THE INVENTION

This invention relates to the general field of internet media software, and has particular application to the analytical evaluation of Internet communications within such software.

BACKGROUND OF THE INVENTION

Video content, both live and pre-recorded, forms a vast and ever-growing percentage of the content consumed on the Internet. Video is rapidly replacing, or at least complementing, written content, and as such, commands a great deal of attention from both the creators of the video content, and those who seek to profit by placing advertisements within videos. Companies and individuals pay other parties for the placement of videos on the internet, both on sites dedicated solely to the medium, or embedded within webpages that offer other forms of content. Individuals, brnads, organizations, and business spend more and more of their budget on creating video or advertising within it. Video advertising is generally accomplished by inserting the video ad as a separate file before the main video plays (pre-roll), halfway through the main video (mid-roll), or immediately following the video (post-roll).

For both video content creators and those who employ the medium for advertising, metrics and analytics are of core importance, just as with any online content. Tracking user behavior (length of time spent watching a video, frequency of ad skipping or blocking, participating in any interactive options offered, etc.) is crucial information. Other important information includes other types of measurements such as surveys and third party analytical tools. While technology does exist for tracking such analytics with online video, the delivery is not always compatible or easily integrated with existing video delivery mediums, platforms, or ad servers. The present invention addresses these issues, providing an easy deployment mechanism, a greater level of accuracy, and a framework for enhanced capabilities in the delivery of analytical tracking tools within videos, and within the advertising embedded within those videos.

SUMMARY OF THE INVENTION

The present invention allows for the deployment of additional and new analytic pathways and information on video playback by human (and automated) users by providing a new delivery mechanism and method for gathering and processing analytics of a given user's interaction with a video (e.g., playing the video, downloading the video and playing it later, sharing the video, etc.). This is achieved in part by placing certain elements within the code of a video file prior to it being uploaded by a user who shares the video. Whenever and wherever the video is played, whether it is streamed once or downloaded and played several times thereafter, the analytic pathway is triggered every time the video file is played because the elements triggering the collection of analytics exist in the video file itself.

DETAILED DESCRIPTION OF THE PREFERRED EMBODIMENT

Figure 1:
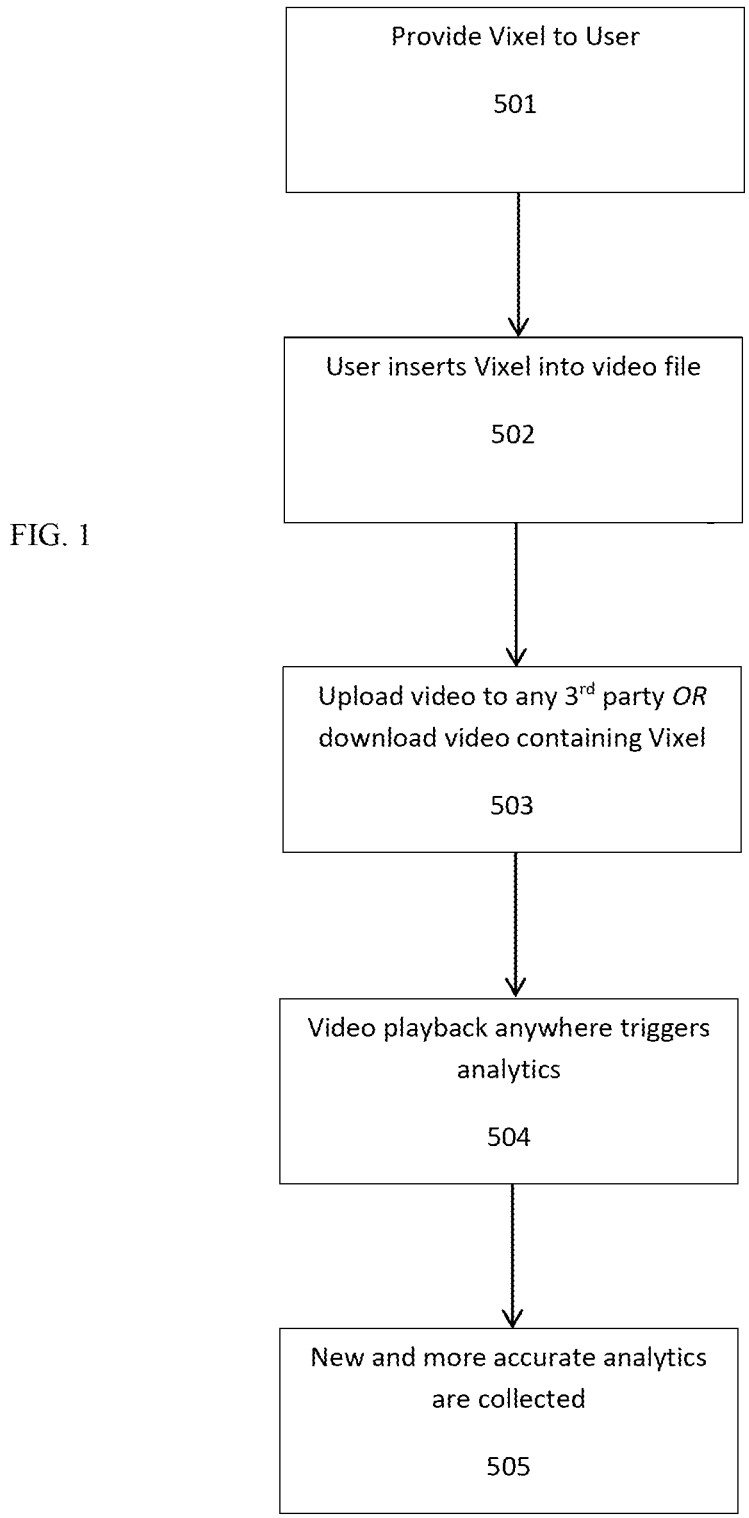
FIG. 1 shows the general process of the present invention. Specifically, it shows the steps for inserting a Vixel into a video file such that the analytics pathway is triggered for every playback of that video file.

One object of the present invention is to provide an easy deployment mechanism for acquiring analytics of live and pre-recorded video content. The easy deployment is due to the fact that the analytics are deployed at a different time (i.e. a different step) in the process of video sharing. Instead of deploying analytics, tracking, or fraud detection mechanisms through various systems, including ad servers and video delivery platforms, which may have differing configurations and which may change over time, the analytics are deployed at a single upstream endpoint, integrating into the video itself, so that wherever the video is deployed (and however much later), the analytics are triggered when the video is played as a matter of course.

Another object of the present invention is to provide a higher level of accuracy in the analytics acquired from said live and pre-recorded video content. The higher level of accuracy is due to the fact that measurement mechanisms are embedded within and called from the video itself, ensuring a higher rate of delivery and measurement than when similar mechanisms are deployed along side the video via third party delivery platforms. The limitations of particular platforms are thus bypassed, resulting in far greater coverage and more accurate measurement. The analytics are, as mentioned before, triggered whenever and wherever the video is played.

Another object of the present invention is to provide a framework for enhanced capabilities; for example, a framework of enhanced, harmonized, cross-platform video analytics that interact with multiple video- and ad-serving platforms, bringing harmonized measurement to a highly varied video-serving landscape, and a common application programming interface across all video delivery platforms. Furthermore, such a framework would provide the ability for end users to deploy custom, user-defined analytical measurements regardless of the configuration or limitations of varied video delivery platforms. Instead, the analytics are communicated due to a signal located in the videos themselves and even within the advertising embedded within those videos.

The objects of the invention and other benefits from the invention are accomplished through the creation and use of the Vixel. "Vixel," or "Vixel Delivery Mechanism," as used herein, is defined as a video pixel, or a video frame, or the program used to embed the Vixel into a video file or anything else (e.g., embedded advertising) within that video file. In order to explain the Vixel, it is first helpful to discuss the tracking pixel. The technology behind the tracking pixel is well known in the art today—it is utilized throughout online interaction to observe and analyze user behavior on websites. The Vixel performs a similar function and provides for a similar level of flexibility and accuracy as the tracking pixel, but now related specifically and particularly to online video including online advertising video. For example, the Vixel, in code, may be defined by the following non-limiting example. This type of file may simply be provided to a user, wherein the user would embed the file into their video file (a process that is well known in the art):

```
package deliverance
{
    import flash.display.*;
    import flash.external.*;
    public dynamic class MainTimeline extends flash.display.MovieClip
    {
        public function MainTimeline( )
        {
            super( );
            addFrameScript(0, this.frame1);
            return;
        }
        public function log(arg1:String):void
        {
            trace(arg1);
            if (flash.external.ExternalInterface.available)
            {
                flash.external.ExternalInterface.call("console.log",
                    arg1);
            }
            return;
        }
        function frame1( ):*
        {
            flash.external.ExternalInterface.call("console.log", "starting
                flash app");
            this.jstag = analyticsTag;
            this.code = "var script = document.createElement( \'script\'
); script.type = \'text/javascript\'; script.src = \'" + this.jstag + "\';
document.body.appendChild(script);";
            flash.external.ExternalInterface.call("function( ) { " +
                this.code + " }( )");
            return;
        }
        public var jstag:String;
        public var code:String;
    }
}
```

Going into further detail, the Vixel mechanism is a video file that is used as a container for the delivery of code or remote assets for tracking and building analytics. As a container, the Vixel may even contain code which, when communicated, sends a signal to a server which, at the exact time that the Vixel is played, the analytics to be recorded is determined dynamically in real-time. The Vixel can be as small as a single frame and can therefore be entirely unnoticed when a video is played. Alternatively, it can comprise multiple frames to delivery multi-stage tracking code. The Vixel may be placed as a standalone video file within pre-roll, mid-roll, or post-roll advertising, or essentially anywhere else in a video playlist. The frame or frames of the Vixel can also be merged directly into a preexisting video file, such as the beginning, middle, or end of a video advertisement or other type of video content.

Due to its nature as single transparent frame of video that is not visible to the user, and that does not impact user experience, the Vixel can be placed at multiple and specific points within a video, so as to capture data a deliver analytics code at particular points within that video, while also leveraging analytics code requiring different states and stages of initialization.

The Vixel mechanism may be a single frame of Flash or other video format that contains or delivers embedded code or requests to remote assets (such as a traditional tracking GIF file). The data capture code may be native to the video file, such as in the case of Flash and Action Script, or can inject or call to an external script like JavaScript. The Vixel mechanism is compatible with the Video Player Ad Interface Definition (VPAID) and Video Ad Serving Template (VAST) specification, and therefore can also be delivered via a VAST formatted ad response. The frame or frames that comprise the mechanism can be in a variety of video formats, including but not limited to Flash/SWF and HTML5. This allows for great flexibility, as the mechanism is compatible with the majority of video technology currently in wide use.

The figures give various examples of how the present invention may be deployed via insertion of a Vixel into a video file. First, a Vixel containing a unique identifier must be inserted into the video file; this general process is exemplified in FIG. 1. First, the Vixel is provided to a user 501. This step may be performed by any user skilled in the art of video design once the Vixel file is obtained (the Vixel is provided by the owner of this application). This step may alternatively occur through a particular online application, such as a website or phone application wherein a user may insert the Vixel(s) into their video file (e.g., uploading the video file to the application, embedding the Vixel(s) in locations desired, or locations suggested by the application, and receiving a final video file comprising the Vixel(s)), such that playback of the video file also causes playback of the Vixel(s). The Vixel(s) may be inserted wherever the user chooses in the video 502. If desired, the application mentioned above may suggest placement or perform random placement. Once the Vixel(s) is (are) inserted into the video file, the user may then upload the video file containing the Vixel(s) to any third party (i.e., any website via any Intranet or the Internet) 503; alternatively, the user may download the Vixel-containing video file and upload it at a later time. The triggering of analytics occurs every time the video is played (due to the code within the Vixel, now embedded in the video file) 504. Thus, when another browsing user watches or plays the video, or downloads it and plays it later, the playback of the video file automatically triggers playback of the vixel(s) located within the video file, said playback of the vixel(s) causing a communication of information to be sent via an analytics pathway triggered by the Vixel(s) within the video file itself. Thus, the insertion of the Vixel(s) into the video file allows for the analytics to be sent each time the video is played—and the beneficiaries of the analytics now enjoy the benefit of a new framework of analytics entirely independent of third party websites used in the playing back of said videos. Therefore, new analytics and more accurate information are both obtained 505.

Figure 2:
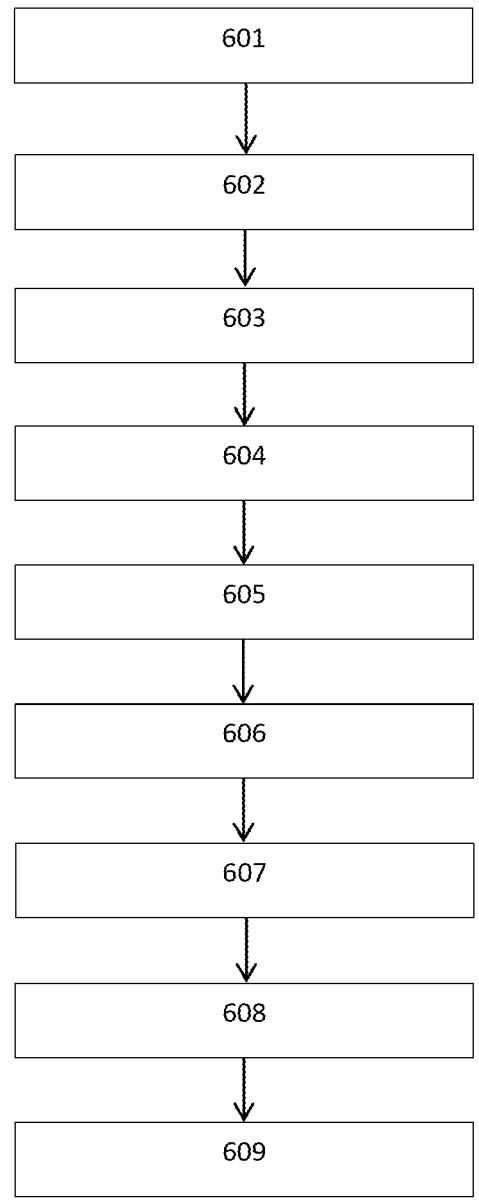
FIG. 2 shows a flowchart example of the same process as FIG. 1 with more detail. This process is described in further detail in the Description below.

The mechanism provides for additional functionality. It can be programmed to support and interface with a variety of existing and future video player APIs. There may also be some additional data capture capabilities exposed by specific video players through the player API. The Vixel can act as a common communication layer for advanced functionality and integration directly with specific video players. The following non-limiting example, as illustrated by the flowchart in FIG. 2, describes some aspects of this advanced functionality and integration:

The user is a business or individual who wishes to deliver video content with integrated measurement analytics. This may generally be achieved either by automated API, or via web or in-app interface. This example describes web interface, but the automated process would be substantially similar, and could be easily integrated into video creation, editing, distribution, and similar platforms such as those comprising an automated or click though process. Initially, the user logs into a vixel interface and begins creation (e.g., requesting) of one or more Vixels specific to the video that they would like to measure by forming, for example, a video specific Vixel identifier 601. Then, the user selects proprietary and third party analytics code to be deployed via the Vixel 602, which serves as the delivery mechanism for the various analytics that the user would like to collect each time the video is deployed or played. Thereafter, the user selects the format in which they would like to download and integrate the Vixel and downloads the Vixel 603. Formats for download may include but are not limited to HTML, HTML5, SWF, MP4, and other similar current and future delivery formats of rich visual media. The user then uses their regular editing, production, or deployment mechanism to insert the Vixel directly into the video file at one or more locations, as they would any other video or rich media element 604. The Vixel may be inserted at one or more points in the video stream (such as at the beginning, end, periodically, before, during, and after advertisements are intended to run), and analytics mechanisms called by the Vixel at any point may continue to collect information even after the Vixel frame has played. It should be noted that editing is central to the creation and distribution of video, so embedding the Vixel similar to another picture, video clip, scene, sound, etc. is natural and simple for the user to perform. The user deploys the video 605 as they normally would, using video servers, video players, content distribution platforms (essentially, any rich media distribution platform may be used), making it available to their intended audiences, and, if applicable, integrating it with advertising. This is the step at which the user would normally deploy one or more analytics mechanisms alongside the video. The need to do this for each distribution mechanism is eliminated via the present invention, and the deployment process is unified as well. Therefore, when the video is played by a viewer in the normal course of its deployment, the Vixel frame plays 606 as any other frame of the video would, and has no impact or visibility to the viewer of the video—it appears as a single transparent frame. When the Vixel frame is played, the code within it executes the previously selected proprietary and third party analytics mechanisms 607, allowing those mechanisms to collect information about the video, advertising, etc., as they normally would (just like they would if deployed alongside the video by prior art, i.e. more complex, methods) 608. Finally, the user may log into the unified Vixel analytics interface, or the interfaces for the individual third party analytics mechanisms that they selected to review analytics with regard to video and advertising performance, as they normally would with any analytics mechanism or service. Where they log into the Vixel interface, they are able to see unified reporting across their proprietary and third party analytics tools 609, allowing apples-to-apples comparisons of metrics across multiple distribution platforms and analytics tools, with far less effort than previously possible.

The Vixel can essentially be used as a container to deliver any third party or external code for a variety of purposes, including but not limited to performance tracking, research surveys, tracking requests to external assets, and third party data integration. Such a container may further be created to be dynamic, such that playback of the Vixel can send a communication to a remote server which, only at the time of the playback, determines which analytics should be collected into the database. Thus, the decision may be made by a secondary program in real-time. Alternatively, the Vixel may carry any code which carries with it a command to perform any function that would be beneficial to an end user in any field of analytics.

The following example illustrates how the Vixel code itself triggers the analytics mechanism, causing the communication of analytics information to be made and collected within the database for storing the information. Analytics code is first embedded within the video file (this may be HTML, Flash, JavaScript, etc.). When the file is played, JavaScript (for example) is pushes to the page and the script is executed. The code is then on the webpage, running parallel to the video file. The JavaScript now exists on the page, and the page may call a particular API in order to interface to a particular video player (e.g., Hulu). The JavaScript then posts back to its source (e.g., the database) incrementally as it listens for particular events (such events may, for example, be particular portions of a video file or particular Vixels embedded within the video, which cause additional commands with regard to the analytics mechanisms available). Such events include but are not limited to start events, stop events, and custom events (e.g., special API calls—this is how the invention may be adjusted and programmed for various APIs (even those that might not exist today but will in the future), skip buttons, add buttons, etc.). All the analytics information collected is stored in a database to which the user has access and may log in to see the statistics and analysis of said statistics whenever is convenient for the user.

The present invention relates to methods and systems of integrating the Vixel into video files. The Vixel itself is a piece of code which can be stitched into any video file. The process of stitching is well known in the art today; however, the step of inserting the Vixel, a novel piece of code, into a video file before or at upload to a third party website for viewing, is a process not thought of until today, as well as a process that will serve to integrate analytics today and in the future. In more detail, the present invention comprises the following: a method for obtaining analytical information, comprising a first step of embedding one or more Vixels into a video file, said embedding occurring at or before the time that a user uploads said video file to any third party, a second step of uploading said video file comprising said one or more Vixels by said user, wherein a playback of said video comprising said one or more Vixels triggers a playback of said one or more Vixels, and wherein said playback of one or more Vixels initiates an analytics mechanism via code located on the Vixel, which is pushed to the page when the Vixel is initiated during video playback.

In some aspects, the analytical mechanism comprises a communication of a piece of analytical information to a database. In some aspects, the analytical mechanism continues to run after said one or more Vixels have played through. This allows for a very dynamic and more accurate ability to obtain the particularly desired metrics or information. In some aspects, the one or more Vixels are embedded into an advertisement embedded within said video file. In some aspects, a Vixel may be embedded into a pre-roll advertisement. In some aspects, a Vixel is embedded into a post-roll advertisement. In some aspects, a Vixel is embedded into a mid-roll advertisement. In some aspects, said communicating of analytical information forms one pathway in a framework of channels, said framework comprising a plurality of pathways within said framework forming a discrete analytics communications network. In some aspects, the Vixel further comprises a dynamic communication code, said dynamic communication code comprising a processor for determining, at an exact time when a video file is played, what analytics mechanisms to run, such that the step of initiating an analytics mechanism is defined based on a real-time determination at each particular time said Vixel within said video file is played back.

In other aspects, the present invention comprises a system for improved analytics, comprising a first unit for creating one or more Vixels for embedding into a video file, a second unit for embedding said Vixel(s) into said video file, a third unit for uploading said video comprising said Vixel, said uploading occurring at or after a time at which said Vixel is embedded into said video file, and a fourth unit for playing back of said video file comprising said Vixel, wherein said playing back of said video file comprising said Vixel causes playback of said Vixel, and wherein playback of said Vixel communicates a piece of analytics information to a database, said database collecting and analyzing said analytics information communicated via a process initiated by the playback of said Vixel.

In some aspects, the system may comprise a Vixel that is embedded into an advertisement embedded within said video file. In some aspects, the Vixel is embedded into a pre-roll advertisement. In some aspects, the Vixel is embedded into a post-roll advertisement. In some aspects, the Vixel is embedded into a mid-roll advertisement. In some aspects, more than one Vixel is embedded into the same video file. In some aspects, the communication of a piece of analytics information to a database continues after a Vixel is played through. Thus, the analytics mechanism may be initiated by a Vixel, but the Vixel is not necessary for the mechanism to continue, even after the Vixel is played through. In some aspects, the communication of a piece of analytics information to a database stops after a second and different Vixel is played through, said second and different Vixel being located later in said video file. In some aspects, varying Vixels embedded into a single video file command an analytics program collecting preset statistics at predetermined locations within said video file.

In other aspects, the present invention also comprises a system for acquiring analytics information, comprising a first unit for embedding a Vixel into a video file, said first unit comprising a first application wherein a user uploads a video file and determines a location within said video to embed said Vixel, said application returning to said user a video file containing an embedded Vixel, a second unit for uploading of said video, said second unit comprising a second application wherein said user uploads said video file containing an embedded Vixel to any third party, and a third unit for collecting analytics information, said third unit comprising a database for storing a plurality of analytics data, said analytics data being communicated via a code located on said Vixel every time said uploaded video file containing an embedded Vixel is played.

In some aspects, the system may further comprise a fourth unit, said fourth unit comprising a processor for continuing the collecting of analytical information on a particular video even after a Vixel has played through.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A method for obtaining analytical information, comprising:
    embedding one or more Vixels into a video file, said embedding occurring at or before the time that a user uploads said video file to any third party,
    uploading of said video file comprising said one or more Vixels by said user,
    wherein a playback of said video comprising said one or more Vixels triggers a playback of said one or more Vixels,
    wherein said playback of one or more Vixels initiates an analytics mechanism, and
    wherein the Vixel further comprises a dynamic communication code, said dynamic communication code comprising a process for determining, at an exact time when a video file is played, what analytics mechanisms to run, such that the step of initiating an analytics mechanism is defined based on a real-time determination at each particular time said Vixel within said video file is played back.

2. The method of claim 1, wherein said analytical mechanism comprises a communication of a piece of analytical information to a database.

3. The method of claim 1, wherein said analytical mechanism continues to run after said one or more Vixels have played through.

4. The method of claim 1, wherein said one or more Vixels are embedded into an advertisement embedded within said video file.

5. The method of claim 4, wherein a Vixel is embedded into a pre-roll advertisement.

6. The method of claim 4, wherein a Vixel is embedded into a post-roll advertisement.

7. The method of claim 4, wherein a Vixel is embedded into a mid-roll advertisement.

8. The method of claim 1, wherein said communicating of analytical information forms one pathway in a framework of channels, said framework comprising a plurality of pathways within said framework forming a discrete analytics communications network.

9. The method of claim 1, wherein a playback of said Vixel causes no impact on a user's experience.

10. The method of claim 1, wherein a playback of said Vixel occurs with zero disruption of the video file in which said Vixel is embedded.

11. A system for acquiring analytics information, comprising:
    a first code for embedding a Vixel into a video file, said first code comprising a first application wherein a user uploads a video file and determines a location within said video to embed said Vixel, said application returning to said user a video file containing an embedded Vixel, a second code for uploading of said video, said second code comprising a second application wherein said user uploads said video file containing an embedded Vixel to any third party, and a third code for collecting analytics information, said third code comprising a database for storing a plurality of analytics data, said analytics data being communicated via a code located on said Vixel every time said uploaded video file containing an embedded Vixel is played, and wherein the Vixel further comprises a dynamic communication code, said dynamic communication code comprising a process for determining, at an exact time when a video file is played, what analytics mechanisms to run, such that the step of initiating an analytics mechanism is defined based on a real-time determination at each particular time said Vixel within said video file is played back.

\* \* \* \* \*